March 18, 1930.    W. R. OLSEN    1,750,685
OPHTHALMIC MOUNTING
Filed Jan. 29, 1926
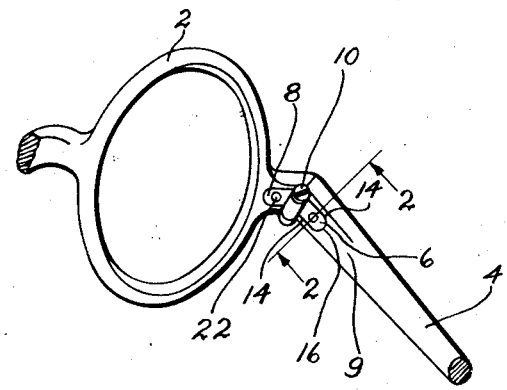
Fig. 1
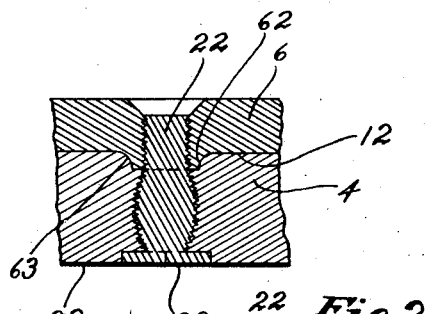
Fig. 2
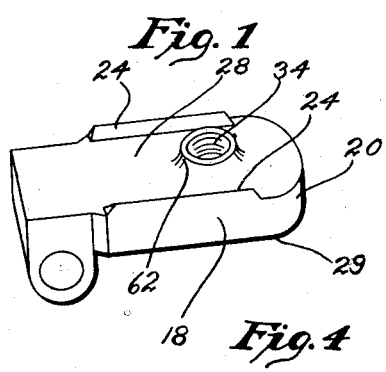
Fig. 4
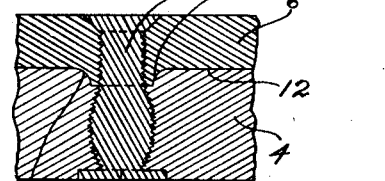
Fig. 3
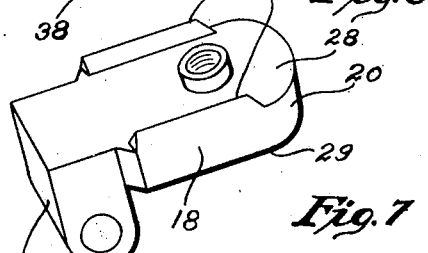
Fig. 7
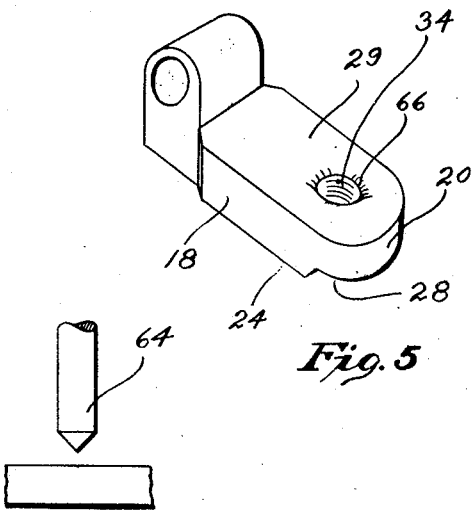
Fig. 5
Fig. 8
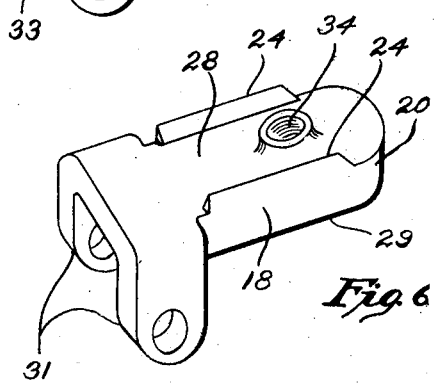
Fig. 6
Inventor
William R. Olsen
By David Rines
Attorney Patented Mar. 18, 1930

1,750,685

UNITED STATES PATENT OFFICE

WILLIAM ROBERT OLSEN, OF ROCHESTER, NEW YORK, ASSIGNOR TO BAUSCH & LOMB OPTICAL COMPANY, OF ROCHESTER, NEW YORK, A CORPORATION OF NEW YORK

OPHTHALMIC MOUNTING

Application filed January 29, 1926. Serial No. 84,759.

The present invention relates to spectacle and other hinged articles, more particularly ophthalmic mountings of the non-metal type, and to hinges for hingedly connecting the parts of such articles together.

In spectacles of the type illustrated in a copending application, Serial No. 477,146, filed June 13, 1921, which matured into Patent No. 1,576,868 on March 16, 1926, the lens-holding front and the temple are connected together by hinges comprising two hinge plates, one mounted in a recess of the lens-holding front and the other in a recess of the temple. Each hinge plate is connected with the front and the temple by single rivets or screws extending through the hinge plate and the non-metal member upon which it is mounted. This construction is very efficient under conditions of ordinary usage. Frequently, however, a careless person will wrench the temple with considerable force in a direction away from the lens-holding front. At such times, the hinge plate on the lens-holding front pulls bodily away from the rivet or screw by which it is held in place. This could, of course, be prevented, by making the hinge plate thicker; but at the expense of making the inherently weak non-metal material thinner, which would make matters worse.

The chief object of the present invention, therefore, is to improve upon spectacles of the above-described character. Other and further objects will be explained hereinafter, and will be particularly pointed out in the appended claims.

With these ends in view, a feature of the invention resides in providing the hinge plate with an integral projection extending towards the head of the screw. Two chief advantages, among others, result. The threads of the hinge plate are brought farther up on the screw, decreasing the leverage and increasing the holding power; and the hinge plate is, in effect, increased in effective thickness at the point where the screw is threaded thereinto, but without in any way weakening the structure as a whole. Experience has shown that the resulting joint is so firm that breakage will not generally occur until sufficient force is applied to root out the screw and the hinge plate as a unit from their setting. The hinge plate seldom tears away from its holding screw.

Other features of the invention will be made clear in connection with the accompanying drawings, in which Fig. 1 is a fragmentary perspective view of an ophthalmic mounting of the above-described character, constructed according to a preferred embodiment of the present invention; Fig. 2 is an enlarged transverse section through one of the hinge plates and a temple to which it is secured, taken substantially upon the line 2—2 of Fig. 1, looking in the direction of the arrows; Fig. 3 is a similar view of a modification; Figs. 4 and 5 are enlarged perspective views of one of the hinge plates shown in Fig. 1; Fig. 6 is a similar view of the other hinge plate; Fig. 7 is a view similar to Fig. 4 of a modification; and Fig. 8 is a view of a preferred method of manufacture.

The invention is for illustrative purposes shown in connection with a spectacle mounting comprising a lens-holding frame member 2 and temple members 4, constituted of plastic, non-metal material like celluloid, zylonite or other composition. The temples 4 are pivotally connected to the lens-holding frame 2 by hinges comprising hinge plates 6 and 8. One face 9 of each of the non-metal members is recessed, the bottom wall of the recess 12 being substantially flat and the recess being shown provided with longitudinally extending walls 14 that may be straight and parallel, if desired, and that are connected by a transversely extending wall 16. There may be a wall (not shown) opposed to the wall 16 or the recess may be open-ended, as desired. The hinge plates 6 and 8 are each provided with a plate-shaped base portion having oppositely disposed, substantially flat, inner and outer faces or sides 28 and 29 and with walls 18 that are connected by a wall 20. The hinge plates and the recesses 12 are so shaped that the hinge plates will fit tightly in the recess, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. One or more perforated ears or knuckles 31 and 33 are integrally disposed laterally upon one side 29 of each hinge plate, out of the general plane of the base portion. Two ears 31 are shown on one hinge plate and a single ear 33 on the other. The hinge plates are pivoted together by a pivot pin 10 that extends through the perforations in the knuckles. The hinge plates are provided with integral beveled wings 24 projecting along the walls 18. The wings 24 are of less length and width than the base portion and offset from the inner side or face 28 of the hinge plate. The hinge plate, after being fitted into position in the recess 12, is forced home by pressure, causing the beveled wings to bite or wedge into, and become embedded within the non-metal material. The non-metal material being plastic, it becomes compressed or wedged into the channel between the wings, effecting a very tight joint. The parts are held together by a single rivet or screw 22, shown screwed into a screw-threaded bore 34 that extends through between the sides 28 and 29 of the hinge plate, and then upset by pressure applied to the opposite ends of the screw. The head 32 of the screw is thus forced into position, flush with the face 38 of the non-metal member, and the body of the screw is caused to bulge out, Figs. 2 and 3, effecting a very tight union of the parts.

The ophthalmic mounting so far described constitutes, in itself, no part of the present invention, and the invention may be embodied as readily in mountings of other types. A chief feature of novelty of the invention resides in increasing the firmness of the joint between the hinge plates and the non-metal material. To this end, one or more of the hinge plates are provided with an integral projection 62 extending from the side 28 between the wings 24. It is through this projection 62 that the screw-threaded bore 34 is provided. The distance of the nearest thread of this bore from the head of the screw is thus lessened, as is clearly shown in Figs. 2 and 3; and the effective thickness of the hinge plate is increased at the point where the screw is threaded into the hinge plate, providing for an increased number of threads and greater holding power. The projection 62 also aids the wings 24 and the rivet 22 to hold the hinge plate in place by biting into the non-metal material, in a groove 63 leading into the recess 12.

The projections 62 may be integrally provided upon the hinge plate in many ways without departing from the spirit of the invention. It may, for example, be cast or stamped in one piece with the hinge plate or soldered in place, as illustrated in Fig. 7. It is preferred, however, to form the projection by driving a pointed tool 64 through the hinge plate, as illustrated in Fig. 8. The projection 62 is thus easily formed at one side 28 of the hinge plate, but a corresponding depression 66 is formed at the other side 29. This depression naturally reduces the number of threads that the bore 34 would otherwise have, though this number is nevertheless greater than would be had were the hinge plate unprovided with the projection 62. To offset this disadvantage, the end of the screw may be swaged into the depression 66 during the upsetting of the screw, as illustrated in Fig. 3, increasing its holding power. Very efficient results may, however, be obtained without such swaging as illustrated in Fig. 2.

The invention may obviously be modified by persons skilled in the art without departing from its spirit and scope, as defined in the appended claims.

What is claimed is:

1. An ophthalmic mounting comprising a non-metal member provided with a substantially flat-bottomed recess, a hinge member comprising a base portion having two oppositely disposed sides, one of the sides being substantially flat, the hinge member lying in the recess with the said one side in contact with the bottom of the recess, the hinge member having an integral projection extending from the said one side and into the non-metal member through the said bottom, the hinge member having an integral attachment member extending from the said one side into the non-metal member, the hinge member having a hinge knuckle disposed on the other of the said two sides, the hinge member having a threaded opening extending through the hinge member between the said two sides and through the projection, and a screw extending through the non-metal member and the hinge member and threaded into the threaded opening for securing the non-metal member and the hinge member together, the screw being upset.

2. An ophthalmic mounting comprising two members, one a lens-holding frame and the other a temple, a hinge pivotally connecting the frame and the temple, the said hinge including a hinge plate mounted upon one of the members, the hinge plate having an integral projection on one of the sides of the plate and a hinge knuckle on the other side of the plate, the projection extending into the said one member, the hinge plate having a threaded opening extending through the hinge plate including the projection, and a screw extending through the hinge plate and the said one member and threaded in the threaded opening for securing the hinge plate and the said one member together.

3. An ophthalmic mounting comprising a lens-holding frame and a temple each comprising non-metal material, and a hinge pivotally connecting the frame and the temple comprising two hinge plates pivoted together, the frame and the temple each being provided with a substantially flat-bottomed recess in which recesses the hinge plates are received, each hinge plate having an integral projection extending into the flat bottom of the corresponding recess, each hinge plate having a threaded opening extending through the corresponding hinge plate and through the corresponding projection, and a screw extending through the non-metal material of the frame and the temple and the hinge plate mounted thereon and threaded into the threaded openings for securing the hinge plates to the frame and the temple.

4. A hinge member comprising a base portion having oppositely disposed sides, one of the sides being substantially flat and having marginal wings, the hinge member having an integral projection extending from the said one side of the base portion between the wings and having a hinge knuckle disposed on the other side of the base portion, and the hinge member having a threaded opening extending through the hinge member between the said two sides and through the projection.

5. A hinge member comprising a plate-shaped base portion having oppositely disposed substantially flat sides and having marginal wings extending from one of the sides, the hinge member having an integral projection extending from the said one flat side of the base portion between the wings and having a hinge knuckle disposed on the other substantially flat side of the base portion, the projection being of less length and width than the base portion, and the hinge member having a threaded opening extending through the hinge member between the said two sides and through the projection.

6. An article of the class described comprising a non-metal member provided with a recess having a substantially flat bottom wall and two walls disposed at opposite sides of the bottom wall, a hinge member comprising a base portion having two oppositely disposed sides and walls connecting the sides, one of the sides being substantially flat, the hinge member lying in the recess with the said one side in contact with the bottom of the recess and with the said walls of the hinge member in contact with the said two walls of the recess, the hinge member having an integral projection extending from the said one side and into the non-metal member through the said bottom wall and having a hinge knuckle disposed upon the other of the said two sides, the hinge member having an opening extending through the hinge member between the said two sides and through the projection, and a securing element extending through the members and through the opening for securing the members together.

7. An ophthalmic mounting comprising a non-metal member provided with a recess having a substantially flat bottom wall and two walls disposed at opposite sides of the bottom wall, a hinge member comprising a base portion having two oppositely disposed sides and walls connecting the sides, one of the sides being substantially flat, the hinge member lying in the recess with the said one side in contact with the bottom of the recess and with the said walls of the hinge member in contact with the said two walls of the recess, the hinge member having an integral projection extending from the said one side and into the non-metal member through the said bottom wall and having a hinge knuckle disposed on the other of the said two sides, the hinge member having a threaded opening extending through the hinge member between the said two sides and through the projection, and a screw extending through the non-metal member and the hinge member and threaded in the threaded opening for securing the non-metal member and the hinge member together.

In testimony whereof, I have hereunto subscribed my name.

WILLIAM ROBERT OLSEN.